United States Patent
Nickel et al.

(10) Patent No.: US 12,512,507 B2
(45) Date of Patent: Dec. 30, 2025

(54) SULFIDIC SOLID ELECTROYLYTE AND ITS PRECURSOR

(71) Applicant: AMG Lithium GmbH, Frankfurt am Main (DE)

(72) Inventors: Vera Nickel, Haiger (DE); Hannes Vitze, Idstein (DE); Christine Gabbey, Marburg (DE); Stefanie Riehl, Rödermark (DE); Stefan Scherer, Griesheim (DE); Martin Janssen, Nauheim (DE)

(73) Assignee: AMG Lithium GmbH, Frankfurt am Main (DE)

( * ) Notice: Subject to any disclaimer, the term of this patent is extended or adjusted under 35 U.S.C. 154(b) by 840 days.

(21) Appl. No.: 17/763,899

(22) PCT Filed: Sep. 24, 2020

(86) PCT No.: PCT/EP2020/076658
§ 371 (c)(1),
(2) Date: Mar. 25, 2022

(87) PCT Pub. No.: WO2021/058620
PCT Pub. Date: Apr. 1, 2021

(65) Prior Publication Data
US 2022/0344709 A1   Oct. 27, 2022

(30) Foreign Application Priority Data
Sep. 27, 2019   (EP) .................... 19200188

(51) Int. Cl.
*H01M 10/0562*   (2010.01)
*H01G 11/56*   (2013.01)
*H01M 8/124*   (2016.01)

(52) U.S. Cl.
CPC ........ *H01M 10/0562* (2013.01); *H01G 11/56* (2013.01); *H01M 8/124* (2013.01); *H01M 2300/008* (2013.01)

(58) Field of Classification Search
CPC ........ H01M 10/0562; H01M 2300/008; H01G 11/56
(Continued)

(56) References Cited

U.S. PATENT DOCUMENTS

2018/0346332 A1* 12/2018 Hashimoto ......... H01M 10/052
2018/0358653 A1   12/2018 Maruyama et al.
(Continued)

FOREIGN PATENT DOCUMENTS

CN   107425218 A   12/2017
JP   2011134617 A   7/2011
(Continued)

OTHER PUBLICATIONS

Rao, R et al. Formation and conductivity studies of lithium argyrodite solid. Solid State Ionics, vol. 230, Jan. 2013, pp. 72-76 [ online], [retrieved on Jan. 15, 2025]. Retrieved from the Internet <URL: https://www.sciencedirect.com/science/article/pii/S0167273812005383> (Year: 2013).*
(Continued)

*Primary Examiner* — Nicholas A Smith
*Assistant Examiner* — Kevin Nguyen
(74) *Attorney, Agent, or Firm* — Rothwell, Figg, Ernst & Manbeck, P.C.

(57) ABSTRACT

The present invention relates to a solid electrolyte, its precursor, methods for producing the same as well as its use, e.g. in electrochemical cells or capacitors, fuel cells, batteries, and sensors.

16 Claims, 1 Drawing Sheet

(58) Field of Classification Search
USPC .......................................................... 429/322
See application file for complete search history.

(56) References Cited

U.S. PATENT DOCUMENTS

| | | | | |
|---|---|---|---|---|
| 2019/0173127 | A1* | 6/2019 | Jang | H01M 10/0562 |
| 2020/0220208 | A1* | 7/2020 | Utsuno | H01M 10/0525 |

FOREIGN PATENT DOCUMENTS

| | | |
|---|---|---|
| JP | 2013-075816 A | 4/2013 |
| JP | 2018-095522 A | 6/2018 |
| WO | 2009/047254 A1 | 4/2009 |
| WO | 2018/054709 A1 | 3/2018 |

OTHER PUBLICATIONS

Chen et al.—High capacity all-solid-state Cu—Li2S/Li6PS5Br/In batteries; Solid State Ionics 262(2014), pp. 183-187.
International Search Report for EP2020-076658 dated Oct. 23, 2020 (2 pages).
Boulineau et al.—Mechanochemical synthesis of Li-argyrodite Li6PS5X (X=Cl, Br, I) as sulfur-based solid electrolytes for all solid state batteries application; Solid State Ionics 221(2012), pp. 1-5.
Rao et al.—"Formation and conductivity studies of lithium argyrodite solid electrolytes using in-situ neutron diffraction"; Solid State Ionics 230(2013), pp. 72-76.
Extended European Search Report for EP19920188 dated Nov. 26, 2019 (1 page).
Rao, R Prasada et al: "Formation and conductivity studies of lithium argyrodite solid electrolytes using in-situ neutron diffraction", Solid State Ionics, vol. 230, (2013), pp. 72-76.
Chen, Maohua et al: "High capacity all-solid-state Cu—Li2S/Li6PS5Br/In batteries", Solid State Ionics, vol. 262, Dec. 11, 2013 (Dec. 11, 2013), pp. 183-187.
Boulineau, Sylvain et al: "Mechanochemical synthesis of Li-argyrodite Li PS(=Cl, Br, I) as sulfur-based solid electrolytes for all solid state batteries application", Solid State Ionics, North Holland Pub. Company. Amsterdam; NL, NL, vol. 221, Jun. 5, 2012 (Jun. 5, 2012), pp. 1-5.
Extended Search Report issued in European Application No. 19200188.1 dated Nov. 26, 2019, 8 pgs.
International Search Report and The Written Opinion issued in PCT/EP2020/076658, dated Oct. 23, 2020, 14 pgs.
Yu, C., et al., "Facile Synthesis toward the Optimal Structure-Conductivity Characteristics of the Argyrodite Li6PS5Cl Solid-State Electrolyte", ACS Applied Materials & Interfaces, vol. 10, 2018, 33296-33306, 11 pages.

* cited by examiner

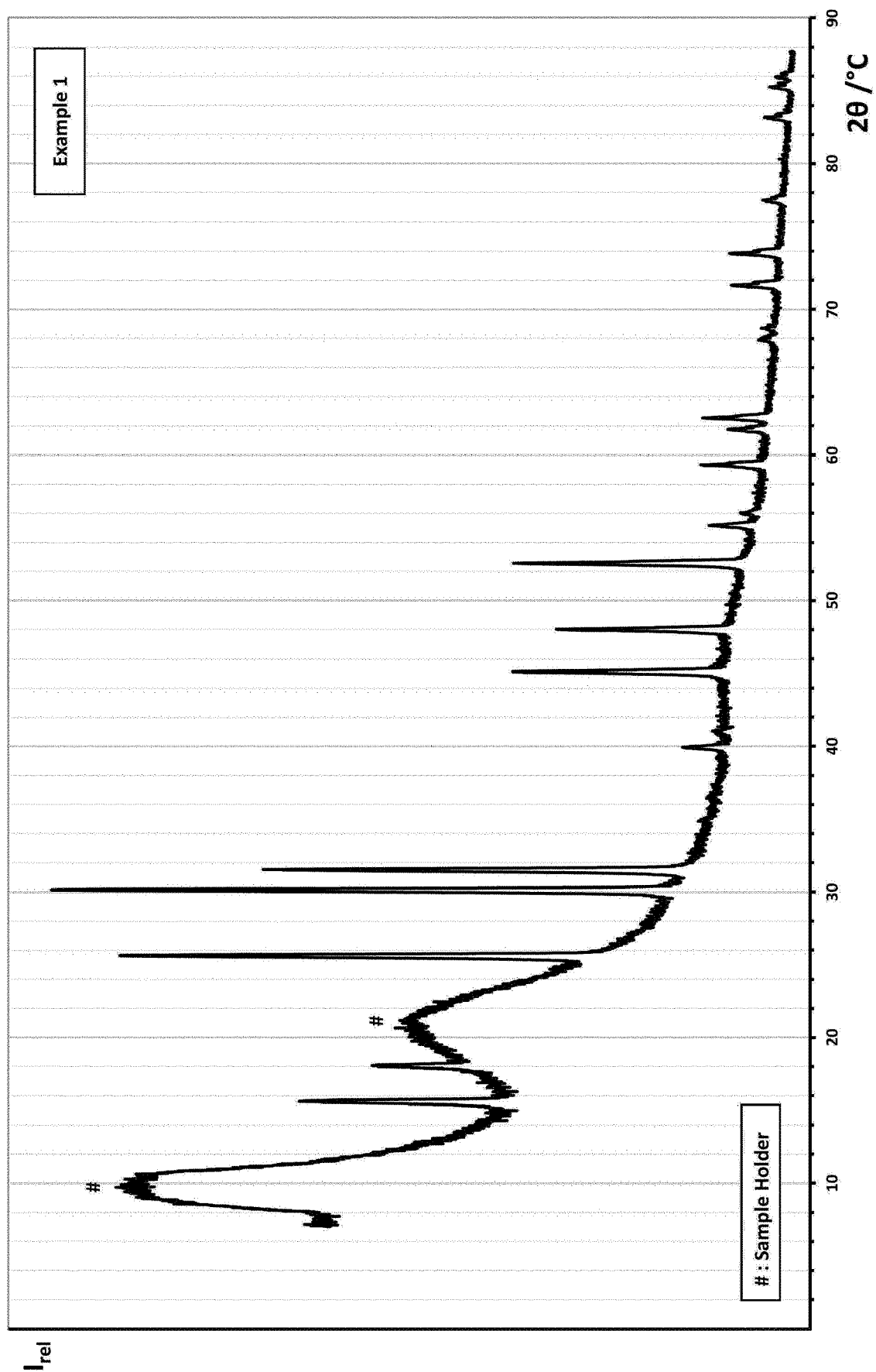

SULFIDIC SOLID ELECTROYLYTE AND ITS PRECURSOR

CROSS REFERENCE TO RELATED APPLICATION

This application is a 35 U.S.C. 371 National Phase Entry Application from PCT/EP2020/076658, filed Sep. 24, 2020, which claims the benefit of European Patent application Ser. No. 19/200,188.1 filed on Sep. 27, 2019, the disclosures of which are incorporated herein in their entirety by reference.

The present invention relates to a solid electrolyte, its precursor, methods for producing the same as well as its use, e.g. in electrochemical cells and capacitors, fuel cells, batteries, and sensors.

Solid electrolytes provide highly mobile ions in an otherwise rigid crystal structure. They are particularly suitable for applications in batteries, fuel cells and sensors as their specific structure supersedes an additional liquid or membrane usually separating the electrodes. By this means, health and safety risks related to harmful or flammable organic liquid electrolytes are avoided. Moreover, it has been shown that solid electrolytes have excellent electronic properties such as high ionic conductivity and electrochemical stability.

A particularly relevant group of solid electrolytes for electrochemical storage devices are cationic solid electrolytes providing mobile lithium ions, such as lithium argyrodite type solid electrolytes, and particularly sulfidic lithium argyrodite type solid electrolytes having the general formula $Li_{12-m-x}^+ M^{m+} S_{6-x}^{2-} X_x^+$ with $M^{m+}=Si^{4+}$, $Ge^{4+}$, $Sn^{4+}$, $P^{5+}$, $As^{5+}$; $X^-=Cl^+$, $Br^-$, $I^-$; $0 \leq x \leq 2$.

WO 2009/047254 A1 describes a method for producing a sulfidic lithium argyrodite having the formula $Li_6PS_5Z$ with Z being selected from Cl, Br and I, comprising the steps of mixing the solid reactants comprising $Li_2S$, $P_2S_5$ and a halogen source in an inert gas atmosphere, pressurizing the mixture and subsequent heating the compact obtained.

US 2018/0358653 A1 discloses a method for producing a solid electrolyte having an argyrodite type crystal structure, comprising milling a raw material comprising lithium, sulfur, phosphorus and halogen as constituent elements, and subsequent heat-treating.

A drawback of the above described solid phase syntheses is that the milling or mixing step does not ensure a homogeneous distribution of the reactants over the raw material to be heated. Thus, the resulting solid electrolyte contains impurities of accumulated, unreacted starting material and/or has an inhomogeneous structure due to the formation of secondary phases of differing composition, impairing the electronic properties of the electrolyte.

WO 2018/054709 A1 discloses a process for preparing a solid electrolyte based on lithium, phosphorus and sulfur, such as $Li_4PS_4I$, in an organic solvent by mixing and heating the reactants in an inert gas atmosphere.

Though providing a more homogeneous distribution of the reactants than solid phase based methods, solvent based methods require costly and time consuming separation, drying and washing steps to remove the organic solvent from the reaction product. Moreover, remaining solvent molecules might interfere with the electronic properties of the solid electrolyte, e.g. reducing its ionic conductivity.

Considering the above, there is an urgent need of new methods for producing a solid electrolyte which overcome the drawbacks of the known processes and allow for the provision of improved solid electrolyte materials.

Thus, the object of the present invention is the provision of a fast, easy and cost-effective method for producing homogeneous solid electrolytes with excellent electric properties such as high ionic conductivity and electrochemical stability.

It was surprisingly found that a solid/gas phase method comprising reacting a solid electrolyte precursor having the formula $Li_{(2a+b)}S_aX_b$, wherein
X is independently selected from group 17 elements,
$2 \leq a \leq 3$, and
$0 < b \leq 2$,
with an at least partially gaseous Y-containing component allows for the provision of an improved solid electrolyte having high purity and homogeneity, represented by the formula $Li_{(2c+d-n)}Y^{n+}S_cX_d$, wherein
Y is independently selected from P, As, Ge, Si, B, Sn, Ga, Al and Sb,
$4 \leq n \leq 5$,
$4 \leq c \leq 6$, and
$0 < d \leq 2$.

In a first aspect, the present invention refers to a solid electrolyte precursor represented by the following formula (I):

$$Li_{(2a+b)}S_aX_b \qquad (I)$$

wherein
X is independently selected from group 17 elements,
$2 \leq a \leq 3$, and
$0 < b \leq 2$.

X is independently selected from group 17 elements (i.e. halogens), preferably from F, Cl, Br and I, more preferably from Cl, Br and I. In one embodiment, X is F or Cl or Br or I, preferably Cl or Br or I. In another embodiment, X is a mixture of at least two group 17 elements, such as a mixture of Cl and Br, Cl and I, or Br and I, with a ratio of element X1 to element X2 of 0.01:0.99-0.99:0.01, preferably 0.1:0.9-0.9-0.1, more preferably 0.3:0.7-0.7:0.3, such as $X=(Cl_{0.5}Br_{0.5})_b$.

The stoichiometry of X may be $0.8 \leq b \leq 1.2$, more preferably $b=1$. The stoichiometry of S may be in the range of $2.4 \leq a \leq 2.6$, more preferably $a=2.5$. Particularly, the solid electrolyte precursor is $Li_6S_{2.5}Cl$, $Li_6S_{2.5}Br$ or $Li_6S_{2.5}I$.

The solid electrolyte precursor has an at least partially ordered atomic arrangement and is preferably in a semi-crystalline or crystalline state, in particular a crystalline state. The atomic arrangement of the precursor may be determined by conventional means known in the art such as e.g. X-ray diffraction (XRD). In a preferred embodiment, the solid electrolyte precursor is in the form of a pure phase. The presence of a pure phase can be detected by X-ray diffraction (XRD) as known by the skilled person in the art.

The solid electrolyte precursor according to the invention has an improved product homogeneity and purity, e.g. being substantially free from unreacted starting material and/or secondary phases of differing composition, preferably lacking unreacted starting material and secondary phases of differing composition.

The precursor may further comprise at least one dopant. A dopant in the sense of the present invention is a supplementary element that is introduced into the solid electrolyte precursor (crystal) structure e.g. to alter its electrical properties, and is preferably present in an amount of less than 10 wt. %, more preferably 0.01-9.0 wt. %, even more preferably 0.10-5.0 wt. %, with reference to the total weight of the precursor. The type of dopant as well as its concentration significantly influences the resulting material properties. Suitable dopants are e.g. Mn, Ge, Sn, V, Ni, Cr, Si, Al, As, O, Se, Te, Mg, Na, Ca, Sb, B, Ga or a mixture thereof, in their respective oxidation state. Dopants selected from B, As, Se and Ni, in their respective oxidation state, more preferably $B^{3+}$, $As^{5+}$, $Se^{2-}$, and $Ni^{2+}$ are particularly beneficial for increasing the ionic conductivity or enable mixed electronic and ionic conduction.

In a further aspect, the present invention refers to a method for producing a solid electrolyte precursor according to the invention, comprising the steps of:
(i) providing a lithium salt in a reaction vessel,
(ii) contacting at least one first reaction gas and at least one second reaction gas with the lithium salt of step (i) at elevated temperatures, and
(iii) optionally discharging the product obtained in step (ii),
wherein one of the first and the second reaction gas is a sulfur-containing gas and the other reaction gas is a X-containing gas.

In step (i) a lithium salt, preferably LiOH, $Li_2CO_3$, $Li_2SO_4$, $Li_2O$, $Li_2O_2$ or a mixture thereof, more preferably LiOH, is provided. The lithium salt may further contain crystal water and/or water not being incorporated in its crystal structure, preferably $Li_2SO_4 \cdot H_2O$ or $LiOH \cdot H_2O$. The overall water content of the lithium salt provided in step (i) may be 0-50 wt. %, such as 10-45 wt. %. In a preferred embodiment, the lithium salt is substantially free from water, e.g. having a water content of less than 5 wt. %, preferably less than 1 wt. %, more preferably 0.01-0.1 wt. %.

Optionally, step (i) is preceded by a step of pre-drying the lithium salt at an elevated temperature, such as at least 80° C., preferably 90-250° C., optionally at reduced pressure, i.e. below atmospheric pressure (<1013 mbar), such as below 500 mbar, e.g. 0.001-100 mbar. Such pre-dried lithium salt may be substantially free from water, e.g. having a water content of less than 5 wt. %, preferably less than 1 wt. %, more preferably less than 0.1 wt. %.

Step (i) and optionally the step of pre-drying may be carried out in dry air or an inert gas atmosphere, such as $N_2$, He or Ar atmosphere. Preferably, the inert gas or dry air is substantially free from water, i.e. having a relative humidity (RH) of less than 10 vol. %, preferably 0.01-5 vol. %, more preferably less than 2 vol. %.

In step (ii) the lithium salt of step (i) is contacted with at least one first reaction gas and at least one second reaction gas at elevated temperatures, such as above 80° C., preferably at 90-250° C. Step (ii) may be carried out in dry air or an inert gas atmosphere, such as $N_2$, He or Ar atmosphere, wherein the inert gas or dry air is preferably substantially free from water, i.e. having a RH of less than 10 vol. %, preferably 0.01-5 vol. %, more preferably less than 2 vol. %. In case both, step (i) and step (ii) are carried out in an inert gas or dry air atmosphere, said gases may be (essentially) the same.

In one embodiment, the at least one first reaction gas is a hydrogen halide, such as HCl, HBr, HI or a mixture thereof, and is preferably HCl or HBr. The at least one second reaction gas may be a sulfur source selected from $H_2S$, $S_8$, $CS_2$, mercaptanes or a mixture thereof, and is preferably $H_2S$.

In another embodiment, the at least one first reaction gas may be a sulfur source selected from $H_2S$, $S_8$, $CS_2$, mercaptanes or a mixture thereof, and is preferably $H_2S$. The at least one second reaction gas may be a hydrogen halide, such as HCl, HBr, HI or a mixture thereof, and is preferably HCl or HBr.

In particular, the at least one first reaction gas and/or the at least one second reaction gas are substantially free from water, i.e. they independently have a RH of less than 10 vol. %, preferably 0.01-5 vol. %, more preferably less than 2 vol. %.

The first and the second reaction gas may be provided sequentially or simultaneously in step (ii). In a preferred embodiment, the first and the second reaction gas are provided simultaneously, wherein they may be contacted, preferably mixed via conventional techniques known in the art, prior to step (ii).

The molar ratio of S in S-containing reaction gas to X in X-containing reaction gas is e.g. 10:1-1:1, preferably 3:1-1.5:1, more preferably 2.6:1-2.4:1. The molar ratio of S in S- and X in X-containing component in the reaction gas to Li in lithium salt provided in step (i) is e.g. 10:1-1:1, preferably 10:1-5:1, more preferably 7:1-5:1.

The at least one first reaction gas may further comprise a carrier gas. A suitable carrier gas is inert and may be selected from dry air and inert gases known in the art, such as $N_2$, He, or Ar, preferably from dry air or $N_2$, and is particularly substantially free from water, i.e. having a RH of less than 10 vol. %, preferably 0.01-5 vol. %, more preferably less than 2 vol. %. Preferably, the carrier gas corresponds to the inert gas applied in step (i) and/or step (ii), if applicable, preferably dry air or water-free $N_2$.

The at least one second reaction gas may likewise comprise a carrier gas. Suitable carrier gases are as described herein and preferably are dry air or water-free $N_2$, and is particularly substantially free from water, i.e. having a RH of less than 10 vol. %, preferably 0.01-5 vol. %, more preferably less than 2 vol. %. In a preferred embodiment, the carrier gas of the second reaction gas corresponds to the carrier gas of the first reaction gas and/or the inert gas applied in step (i) and/or step (ii), if applicable, preferably dry air or water-free $N_2$.

Step (ii) may be performed at a total gas flow of 0.1-1000 $m^3/h$, preferably 5-500 $m^3/h$, more preferably 10-50 $m^3/h$, wherein the total gas flow includes the S-containing reaction gas, the X-containing reaction gas and the carrier gases, if applicable. The total gas flow may inter alia depend on the amount of lithium salt provided in step (i), the type of precursor to be obtained and the reaction temperature. Moreover, the total gas flow may also be dependent on the amount of water formed as a by-product in step (ii), as the removal of said water, e.g. by the gas flow passing the reaction vessel, is essential for a full conversion of the lithium salt in step (ii).

Furthermore, the amount of water by-product may serves as a reaction control to determine the time point of (essentially) full conversion of the lithium salt in step (ii). By this means, the duration of step (ii) may be individually adapted to the reaction conditions. Preferably, the duration of step (ii) is up to 24 h, such as 15 min-15 h, dependent on the individual reaction conditions.

In order to provide a proper reaction atmosphere such as an inert gas or dry air atmosphere during step (i) and/or step (ii), the reaction vessel may be sealed, thus being isolated from the surrounding, while at least one gas inlet and at least one gas outlet allow for the controlled introduction and removal of gas such as dry air, inert gas, reaction gas, carrier gas and/or water vapor into and from the vessel, respectively. A suitable reaction vessel is e.g. a heatable fluidized bed reactor known in the art.

In one embodiment, the product obtained in step (ii) is discharged from the reaction vessel. In another embodiment, the method according to the invention further comprises a step of adding to the product obtained in step (ii) at least one doping agent such as an anionic or cationic doping agent.

Cationic doping agents may comprise Mn, Ge, Sn, V, Ni, Cr, Si, Al, As, Se, O, Te, Mg, Na, Ca, Sb, B, Ga in their respective oxidation states or a mixture thereof. Anionic doping agents may comprise $O^{2-}$, $Se^{2-}$, or $Te^{2-}$. The doping agent may be present in liquid, solid or gaseous form. Preferably, the doping agent is present in solid form such as in the form of a salt. Suitable cationic doping agents are e.g. hydroxide, carbonate or sulfide salts, such as $As_2S_5$, $Ni(OH)_2$ or $Mg(CO_3)$ or a mixture thereof. Suitable anionic doping agents are e.g. lithium salts, such as $Li_2O$, $Li_2Se$ or $Li_2Te$ or a mixture thereof. The step of adding at least one doping agent may additionally comprise mixing the product obtained in step (ii) and the at least one doping agent by means of grinding, e.g. by a ball mill, or stirring known in the art.

Optionally, the product obtained after such doping step is discharged from the reaction vessel. In another embodiment, the product obtained in step (ii) or the product obtained after a doping step is left in the reaction vessel and further reacted to yield a solid electrolyte as described herein.

Thus, in a further aspect, the present invention refers to a use of a solid electrolyte precursor according to the invention for preparing a solid electrolyte. In particular, the solid electrolyte is represented by the following formula (II):

$$Li_{(2c+d-n)}Y^{n+}{}_cS_cX_d \quad (II)$$

wherein X is independently selected from group 17 elements, preferably Cl, Br and I, Y is independently selected from P, As, Ge, Si, B, Sn, Ga, Al and Sb, and is preferably P, $4 \leq n \leq 5$, $4 \leq c \leq 6$, preferably $4.5 \leq c \leq 5.5$, and $0 < d \leq 2$, preferably $0.8 \leq d \leq 1.2$.

$Y^{n+}$ is preferably independently selected from $P^{5+}$, $As^{5+}$, $Ge^{4+}$, $Si^{4+}$, $B^{3+}$, $Sn^{4+}$, $Ga^{3+}$, $Al^{3+}$ and $Sb^{5+}$. In a preferred embodiment, the present invention refers to the use of a solid electrolyte precursor according to the invention for preparing $Li_6PS_5Cl$, $Li_6PS_5Br$ or $Li_6PS_5I$.

Moreover, the present invention refers to a method for preparing a solid electrolyte, comprising the steps of:
(a) providing a solid electrolyte precursor as described above in a reaction vessel,
(b) contacting a Y-containing component with the solid electrolyte precursor of step (a), and
(c) optionally discharging the product obtained in step (b),
wherein step (b) is performed at elevated temperatures, wherein Y is independently selected from P, As, Ge, Si, B, Sn, Ga, Al and Sb, and is preferably P, and wherein the Y-containing component is at least partially present in a gaseous phase in step (b).

In step (a) a solid electrolyte precursor according to the invention is provided in a reaction vessel. Preferably, step (a) is preceded by a method for producing said solid electrolyte precursor according to the invention and particularly, step (a) is performed subsequent to step (ii).

Step (a) may be carried out in dry air or an inert gas atmosphere, such as $N_2$, He or Ar atmosphere. Preferably, the inert gas or dry air is substantially free from water, i.e. having a relative humidity (RH) of less than 10 vol. %, preferably 0.01-5 vol. %, more preferably less than 2 vol. %.

In step (b) the solid electrolyte precursor of step (a) is contacted with a Y-containing component at elevated temperatures. The Y-containing component may be selected from $P_2S_5$, $As_2S_5$, $GeS_2$, $SiS_2$, $B_2S_3$, $SnS$, $Ga_2S_3$, $Al_2S_3$, $Sb_2S_5$ or a mixture thereof and is preferably $P_2S_5$. Preferably, the Y-containing component is substantially free from water, i.e. having a RH of less than 10 wt. %, preferably 0.01-5 wt. %, more preferably less than 2 wt. %.

The temperature maintained in step (b) is sufficient to at least partially provide the Y-containing component in a gaseous phase, such as at least 285° C., preferably 288-900° C. In a preferred embodiment, the Y-containing component is heated outside the reaction vessel, e.g. to a temperature of at least 285° C., preferably 288-900° C., such that step (b) comprises contacting a Y-containing gas with the solid electrolyte precursor of step (a) at elevated temperatures. The molar ratio of Y in Y-containing component to solid electrolyte precursor provided in step (a) may be 0.2:1-2:1, preferably 0.5:1-1:1.

Step (b) may be carried out in dry air or an inert gas atmosphere, such as $N_2$, He or Ar atmosphere, wherein the dry air or inert gas is preferably free from water, i.e. having a RH of less than 10 vol. %, preferably 0.01-5 vol. %, more preferably less than 2 vol. %. In case both, step (a) and step (b) are carried out in an inert gas or dry air atmosphere, said gases may be (essentially) the same.

The Y-containing component may further comprise a carrier gas. A suitable carrier gas is inert and may be selected from dry air and inert gases known in the art, such as $N_2$, He, or Ar, preferably from dry air or $N_2$, and is particularly free from water, i.e. having a RH of less than 10 vol. %, preferably 0.01-5 vol. %, more preferably less than 2 vol. %. Preferably, the carrier gas corresponds to the inert gas applied in step (a) and/or step (b), if applicable, and preferably is dry air or water-free $N_2$.

Step (b) may be performed at a total gas flow of 0.1-1000 m³/h, preferably 5-500 m³/h, more preferably 10-50 m³/h, such as 20 m³/h, wherein the total gas flow includes the Y-containing reaction gas and the carrier gas, if applicable. The total gas flow may inter alia be dependent on the amount of solid electrolyte precursor provided in step (a), the type of solid electrolyte to be obtained and the reaction temperature. The duration of step (b) may be up to 24 h, such as 15 min-15 h, dependent on the individual reaction conditions.

In order to provide a proper reaction atmosphere such as an inert gas or dry air atmosphere during step (i) and/or step (ii), the reaction vessel may be sealed, thus being isolated from the surrounding, while at least one gas inlet and at least one gas outlet allow for the controlled introduction and removal of gas such as dry air, inert gas, Y-containing reaction gas and/or carrier gas into and from the vessel, respectively. The reaction vessel may e.g. be a heatable fluidized bed reactor known in the art.

In one embodiment, the product obtained in step (b) is discharged from the reaction vessel. Also encompassed by the present invention is a method for preparing a solid electrolyte as described above, further comprising a step of adding to the product obtained in step (b) at least one doping agent such as an anionic or cationic doping agent Cationic doping agents may comprise Mn, Ge, Sn, V, Ni, Cr, Si, Al, As, Se, O, Te, Mg, Na, Ca, Sb, B, Ga in their respective oxidation states or a mixture thereof. Anionic doping agents may comprise $O^{2-}$, $S^{2-}$, or $Te^{2-}$. The doping agent may be present in liquid, solid or gaseous form. Preferably, the doping agent is present in solid form such as in the form of a salt. Suitable cationic doping agents are e.g. hydroxide, carbonate or sulfide salts, such as $As_2S_5$, $Ni(OH)_2$ or $Mg(CO_3)$ or a mixture thereof. Suitable anionic doping agents are e.g. lithium salts, such as $Li_2O$, $Li_2Se$ or $Li_2Te$ or a mixture thereof.

The amount of doping agent added to the product obtained in step (b) is e.g. dependent on the type of doping agent and the amount of product obtained in step (b) and particularly results in an amount of dopant in the solid electrolyte being less than 10 wt. %, preferably 0.01-9.0 wt. %, more preferably 0.10-5.0 wt. %, with reference to the total weight of the solid electrolyte.

The step of adding at least one doping agent may additionally comprise mixing the product obtained in step (b) and the at least one doping agent by means of grinding, e.g. by a ball mill, or stirring known in the art. Preferably, the step of adding at least one doping agent is conducted if the solid electrolyte precursor provided in step (a) does not comprise a dopant.

In a further aspect, the present invention refers to a solid electrolyte obtainable by a method as described herein. In contrast to solid electrolytes obtainable by methods known in the art, such as solid based or solvent based methods, the solid electrolyte obtainable by a method according to the invention has an improved product homogeneity and purity, lacking unreacted starting material and secondary phases of differing composition. By this means, solid electrolytes having improved electric properties, such as improved ionic conductivity and electrochemical stability, are obtained. Preferably, the solid electrolyte obtainable by a method as described herein has an ionic conductivity of 0.01-500 mS/cm, preferably 1-100 mS/cm at 20° C.

Product homogeneity and purity may be determined by conventional means known in the art such as X-ray powder diffraction (XRD). In particular, a typical XRD pattern of solid electrolytes according to the invention, e.g. recorded using $CuK_\alpha$ radiation, has dominating product reflections and, if at all, minor reflections deriving from impurities such as by-products and unreacted starting material.

In a preferred embodiment, the solid electrolyte is in the form of a pure phase. The presence of a pure phase can be detected by X-ray diffraction (XRD) as known by the skilled person and in the art.

Particularly, the solid electrolyte according to the invention is substantially free from reflections in a X-ray powder diffractogram using $CuK_\alpha$ radiation at a 2θ angle [°]:17.5, 18.0, 32.5, 34.9, 44.8, 46.7, 50.2 and/or 53.1 more particularly 17.5, 18.0, 32.5, 34.9, 44.8, 46.7, 50.2 and 53.1 corresponding to reflections of undesired impurities.

In a preferred embodiment, the solid electrolyte according to the invention is substantially free from reflections in a X-ray powder diffractogram using $CuK_\alpha$ radiation at a 2θ angle [°]: 17.5, 18.0, 34.9, 44.8, 50.2, and/or 53.1, more particularly 17.5, 18.0, 34.9, 44.8, 50.2, and 53.1.

In another preferred embodiment, the solid electrolyte according to the invention is substantially free from reflections in a X-ray powder diffractogram using $CuK_\alpha$ radiation filter at a 2θ angle [°]: 17.5, 18.0, 32.5, 44.8, 46.7, and/or 53.1, more particularly 17.5, 18.0, 32.5, 44.8, 46.7, and 53.1.

The term "substantially free from reflections" in the sense of the present invention means that reflections at the respective 2θ angles have an intensity of at most 5%, preferably at most 2%, more preferably at most 1% of the most intense product reflection recorded for the specific solid electrolyte.

In a still further aspect, the present invention refers to a solid electrolyte represented by the following formula (II):

$$Li_{(2c+d-n)}Y^{n+}S_cX_d \quad (II)$$

wherein X is independently selected from group 17 elements, preferably Cl, Br and I, Y is independently selected from P, As, Ge, Si, B, Sn, Ga, Al and Sb, 4≤n≤5, 4≤c≤6, and 0<d≤2, being substantially free from reflections in a X-ray powder diffractogram using $CuK_\alpha$ radiation at a 2θ angle [°]:17.5, 18.0, 32.5, 34.9, 44.8, 46.7, 50.2 and/or 53.1.

In a preferred embodiment, the solid electrolyte according to the invention is substantially free from reflections in a X-ray powder diffractogram using $CuK_\alpha$ radiation at a 2θ angle [°]: 17.5, 18.0, 34.9, 44.8, 50.2, and 53.1.

In another preferred embodiment, the solid electrolyte according to the invention is substantially free from reflections in a X-ray powder diffractogram using $CuK_\alpha$ radiation with $CuK_\alpha$ filter at a 2θ angle [°]: 17.5, 18.0, 32.5, 44.8, 46.7, and 53.1.

The term "substantially free from reflections" in the sense of the present invention means that reflections at the respective 2θ angles have an intensity of at most 5%, preferably at most 2%, more preferably at most 1% of the most intense product reflection recorded for the specific solid electrolyte.

In a preferred embodiment the solid electrolyte according to formula (II) has characteristic reflections in a X-ray powder diffractogram using $CuK_\alpha$ radiation at a 2θ angle [°] selected from: 25.2, 25.5, 29.6, 30.0, 31.0 and/or 31.4. In a preferred embodiment, the solid electrolyte comprises characteristic reflections in a X-ray powder diffractogram using $CuK_\alpha$ radiation at a 2θ angle [°]: 25.5, 30.0, and 31.4. In another preferred embodiment, the solid electrolyte comprises characteristic reflections in a X-ray powder diffractogram using $CuK_\alpha$ radiation at a 2θ angle [°]: 25.2, 29.6, and 31.0.

"Characteristic reflections" in the sense of the present invention are reflections having an intensity of at least 40%, preferably at least 50%, more preferably at least 60% of the most intense reflection recorded for the specific solid electrolyte.

X is independently selected from group 17 elements, preferably F, Cl, Br and I. In one embodiment, X is F or Cl or Br or I, preferably Cl or Br or I. In another embodiment, X is a mixture of at least two group 17 elements, such as a mixture of Cl and Br, Cl and I, or Br and I, with a ratio of element X1 to element X2 of 0.01:0.99-0.99:0.01, preferably 0.1:0.9-0.9:0.1, more preferably 0.3:0.7-0.7:0.3, such as $X=(Cl_{0.5}Br_{0.5})_d$.

$Y^{n+}$ is preferably independently selected from $P^{5+}$, $As^{5+}$, $Ge^{4+}$, $Si^{4+}$, $B^{3+}$, $Sn^{4+}$, $Ga^{3+}$, $Al^{3+}$ and $Sb^{5+}$. In one embodiment, $Y^{n+}$ is $P^{5+}$ or $As^{5+}$ or $Ge^{4+}$ or $Si^{4+}$ or $B^{3+}$ or $Sn^{4+}$ or $Ga^{3+}$ or $Al^{3+}$ or $Sb^{5+}$, preferably $P^{5+}$. In another embodiment, $Y^{n+}$ is a mixture of at least two of $P^{5+}$, $As^{5+}$, $Ge^{4+}$, $Si^{4+}$, $B^{3+}$, $Sn^{4+}$, $Ga^{3+}$, $Al^{3+}$ and $Sb^{5+}$, such as a mixture of $P^{5+}$ and $As^{5+}$, or $P^{5+}$ and $Sb^{5+}$, preferably with a ratio of element Y1 to element Y2 of 0.01:0.99-0.99:0.01, preferably 0.1:0.9-0.9:0.1, more preferably 0.3:0.7-0.7:0.3.

In a preferred embodiment, the stoichiometry of X is 0.5≤d≤1.5, more preferably 0.8≤d≤1.2. In a preferred embodiment the stoichiometry of S is 4.5≤c≤5.5, more preferably 4.8≤c≤5.2.

In a preferred embodiment, the stoichiometry of X is 0.5≤d≤1.5, preferably 0.8≤d≤1.2, and the stoichiometry of S is 4.5≤c≤5.5, preferably 4.8≤c≤5.2. Particularly, the solid electrolyte is $Li_6PS_5Cl$, $Li_6PS_5Br$ or $Li_6PS_5I$.

The solid electrolyte is preferably in a crystalline state, e.g. having an argyrodite-like crystal structure (orthorhombic-pyramidal, space group F-43m). The atomic arrangement of the solid electrolyte may be detected by conventional means known in the art such as X-ray diffraction (XRD).

The solid electrolyte may further comprise at least one dopant. A dopant in the sense of the present invention is a supplementary element that is introduced into the solid electrolyte (crystal) structure e.g. to alter its electrical properties. The type of dopant as well as its concentration significantly influences the resulting material properties. Suitable cationic dopants are e.g. Mn, Ge, Sn, V, Ni, Cr, Si, Al, As, Se, O, Te, Mg, Na, Ca, Sb, B, Ga or a mixture thereof, in their respective oxidation state. Anionic doping agents may comprise $O^{2-}$, $S^{2-}$, $Te^{2-}$. Dopants selected from B, As, Se and Ni, in their respective oxidation state, are particularly beneficial for increasing the ionic conductivity or enable mixed electronic and ionic conduction. The dopant may be present in an amount of less than 10 wt. %, preferably 0.01-9.0 wt. %, more preferably 0.10-5.0 wt. %, with reference to the total weight of the solid electrolyte.

In contrast to conventional solid electrolytes, a solid electrolyte according to the invention has an improved product homogeneity and purity, e.g. lacking unreacted starting material and secondary phases of differing composition. In a preferred embodiment, the solid electrolyte is in the form of a pure phase. Suitable means to determine product homogeneity and purity as well as the presence of a pure phase are as described herein.

By this means, solid electrolytes having improved electric properties, such as high ionic conductivity and electrochemical stability, are obtained. Preferably, the solid electrolyte has an ionic conductivity of 0.01-500 mS/cm, preferably 1-100 mS/cm at 20° C.

In a further aspect, the present invention refers to a use of a solid electrolyte according to the invention in an electrochemical cell. In a still further aspect, the present invention refers to a use of a solid electrolyte according to the invention in a fuel cell. In a still further aspect, the present invention refers to a use of a solid electrolyte according to the invention in a battery. In a still further aspect, the present invention refers to a use of a solid electrolyte according to the invention in a sensor. In a still further aspect, the present invention refers to a use of a solid electrolyte according to the invention in a supercapacitor. Moreover, the present invention refers to an electrochemical cell comprising the solid electrolyte according to the invention.

The present invention shall be further illustrated in more detail but not limited by the following FIGURE and example.

FIG. 1: XRD pattern of $Li_6PS_5Cl$ measured with CuKα radiation in a 2θ range of 5-90° and displayed as relative intensity $I_{rel}$. Peaks marked with # originate from the sample holder.

EXAMPLE 1

100.0 g of LiOH H$_2$O having a total water content of 42 wt. % were heated at 150° C. for 1 h in a fluidized bed reactor. Subsequently, the pre-dried lithium salt was contacted with a reaction gas, comprising HCl and H$_2$S in a molar ratio of 1:2.5, as well as nitrogen as a carrier gas in a content of 95 vol. % with respect to the total amount of gas, at a total gas flow of 18 m³/h for 1 h at 150° C., yielding the solid electrolyte precursor.

Then, the solid electrolyte precursor was contacted with gaseous P$_2$S$_5$ at 288° C. at a total gas flow of 18 m³/h (including nitrogen as a carrier gas in a content of 95 vol. % with respect to the total amount of gas) for 1 h, wherein the molar ratio of P$_2$S$_5$ to solid electrolyte precursor was 0.5:1.

The solid electrolyte obtained has a stoichiometric composition of Li:P:S:Cl of 6:1:5:1 and an ionic conductivity of 4.5 mS/cm at room temperature, measured under inert gas atmosphere with electrochemical impedance spectroscopy on an Metrohm Autolab in a frequency range from 1 MHz to 100 Hz. The sample pellet was prepared by grinding the solid electrolyte powder and filled into a pressurized sample cell with a diameter of 13 mm with stainless steel electrodes. The applied pressure during measurement was p=3t. An X-ray powder diffraction analysis was conducted on a Bruker D2 phaser diffractometer with CuKα radiation in a 2θ range of 5-90° with a step width of 0.020°.

The respective powder pattern showed characteristic reflections at a 2θ angle [°]: 25.53, 30.04, and 31.41, and no reflections at a 2θ angle [°]: 17.53, 18.05, 32.52, 34.88, 44.81, 46.66, 50.17, and 53.10 (see FIG. 1).

The present invention covers the following items:
1. A solid electrolyte precursor represented by the following formula (I):

$$Li_{(2a+b)}S_aX_b \qquad (I)$$

wherein X is independently selected from group 17 elements,
$2 \leq a \leq 3$, and
$0 < b \leq 2$.

2. The precursor according to item 1, wherein X is independently selected from the group consisting of Cl, Br and I.
3. The precursor according to any of the preceding items, wherein $0.8 \leq b \leq 1.2$.
4. The precursor according to any of the preceding items, wherein $2.4 \leq a \leq 2.6$.
5. The precursor according to any of the preceding items, being selected from $Li_6S_{2.5}Cl$, $Li_6S_{2.5}Br$ and $Li_6S_{2.5}I$.
6. The precursor according to any of the preceding items, further comprising at least one dopant.
7. The precursor according to item 6, wherein the dopant is selected from Mn, Ge, Sn, V, Ni, Cr, Si, Al, As, Se, O, Te, Mg, Na, Ca, Sb, B, Ga or a mixture thereof in their respective oxidation state.
8. The precursor according to any of items 6-7, wherein the dopant is present in an amount of less than 10 wt. %, preferably 0.01-9.0 wt. %, more preferably 0.10-5.0 wt. %, with reference to the total weight of the precursor.
9. The precursor according to any of the preceding items, being in a crystalline state, preferably in the form of a pure phase.
10. A method for producing a solid electrolyte precursor according to any of items 1-9, comprising the steps of:
   (i) providing a lithium salt in a reaction vessel,
   (ii) contacting at least one first reaction gas and at least one second reaction gas with the lithium salt of step (i) at elevated temperatures, and
   (iii) optionally discharging the product obtained in step (ii),
   wherein one of the first and the second reaction gas is a sulfur-containing gas and the other reaction gas is a X-containing gas.
11. The method according to item 10, wherein the lithium salt has a water content of 0-50 wt. %, preferably 0-10 wt. %.
12. The method according to any of items 10-11, wherein step (i) is preceded by a step of pre-drying the lithium salt at an elevated temperature, such as at least 80° C., preferably 90-250° C., optionally at reduced pressure.
13. The method according to any of items 10-12, wherein the lithium salt in step (i) is LiOH, $Li_2CO_3$, $Li_2SO_4$, $Li_2O$, $Li_2O_2$ or a mixture thereof.
14. The method according to any of items 10-13, wherein step (i) and/or step (ii) is carried out in dry air or an inert gas atmosphere, such as $N_2$, He or Ar atmosphere.

15. The method according to item 14, wherein the inert gas or dry air is substantially free from water.
16. The method according to any of items 10-15, wherein step (ii) is performed at temperatures above 80° C., preferably at 90-250° C.
17. The method according to any of items 10-16, wherein the at least one first reaction gas is a hydrogen halide, such as HCl, HBr, HI or a mixture thereof, and, preferably, the at least one second reaction gas is a sulfur source selected from $H_2S$, $S_8$, $CS_2$, mercaptanes or a mixture thereof.
18. The method according to any of items 10-17, wherein the at least one first reaction gas is a sulfur source selected from $H_2S$, $S_8$, $CS_2$, mercaptanes or a mixture thereof, and, preferably, the at least one second reaction gas is a hydrogen halide, such as HCl, HBr, HI or a mixture thereof.
19. The method according to any of items 10-18, wherein in step (ii) the first and the second reaction gas are provided sequentially or simultaneously.
20. The method according to any of items 10-19, wherein the at least one first reaction gas and the at least one second reaction gas are contacted prior to step (ii).
21. The method according to any of items 10-20, wherein the at least one first reaction gas and the at least one second reaction gas are substantially free from water.
22. The method according to any of items 10-21, wherein the molar ratio of S in S-containing reaction gas to X in X-containing reaction gas is 10:1-1:1, preferably 3:1-1.5:1, more preferably 2.6:1-2.4:1.
23. The method according to any of items 10-22, wherein the at least one first reaction gas further comprises a carrier gas.
24. The method according to any of items 10-23, wherein the at least one second reaction gas further comprises a carrier gas.
25. The method according to any of items 10-24, wherein step (ii) is performed at a total gas flow of 0.1-1000 m³/h, preferably 5-500 m³/h, more preferably 10-50 m³/h even more preferably about 20 m³/h.
26. The method according to any of items 10-25, further comprising a step of adding to the product obtained in step (ii) at least one doping agent, e.g. comprising Mn, Ge, Sn, V, Ni, Cr, Si, Al, As, O, Se, Te, Mg, Na, Ca, Sb, B, Ga or a mixture thereof in their respective oxidation state as a dopant.
27. The method according to item 26, wherein the at least one doping agent is an anionic or cationic doping agent, in particular provided in the form of a salt.
28. Use of a solid electrolyte precursor according to any of items 1-9 for preparing a solid electrolyte.
29. The use according to item 28, wherein the solid electrolyte is represented by the following formula (II):

$$Li_{(2c+d-n)}Y^{n+}S_cX_d \quad (II)$$

wherein X is independently selected from group 17 elements, preferably Cl, Br and I,
Y is independently selected from P, As, Ge, Si, B, Sn, Ga, Al and Sb,
$4 \leq n \leq 5$,
$4 \leq c \leq 6$, and
$0 < d \leq 2$.
30. A method for preparing a solid electrolyte, comprising the steps of:
(a) providing a solid electrolyte precursor according to any of items 1-9 in a reaction vessel,
(b) contacting a Y-containing component with the solid electrolyte precursor of step (a), and
(c) optionally discharging the product obtained in step (b),
wherein step (b) is performed at elevated temperatures, wherein Y is independently selected from P, As, Ge, Si, B, Sn, Ga, Al and Sb, and
wherein the Y-containing component is at least partially present in a gaseous phase in step (b).
31. The method according to item 30, wherein step (a) and/or step (b) is carried out in dry air or an inert gas atmosphere, such as $N_2$, He or Ar atmosphere.
32. The method according to item 31, wherein the inert gas or dry air is substantially free from water.
33. The method according to any of items 30-32, wherein step (b) is performed at temperatures above 285° C., preferably at 288-900° C.
34. The method according to any of items 30-33, wherein the Y-containing component is selected from $P_2S_5$, $As_2S_5$, $GeS_2$, $SiS_2$, $B_2S_3$, SnS, $Ga_2S_3$, $Al_2S_3$, $Sb_2S_5$ or a mixture thereof.
35. The method according to any of items 30-34, wherein in step (b) the molar ratio of
Y in Y-containing component to solid electrolyte precursor provided in step (a) is 0.2:1-2:1, preferably 0.5:1-1:1.
36. The method according to any of items 30-35, wherein the Y-containing component is substantially free from water.
37. The method according to any of items 30-36, wherein the Y-containing component further comprises a carrier gas.
38. The method according to any of items 30-37, wherein step (b) is performed at a total gas flow of 0.1-1000 m³/h, preferably 5-500 m³/h, more preferably 10-50 m³/h, even more preferably about 20 m³/h.
39. The method according to any of items 30-38, further comprising a step of adding to the product obtained in step (b) at least one doping agent, e.g. a cationic or anionic doping agent.
40. The method according to item 39, wherein the at least one cationic doping agent comprises Mn, Ge, Sn, V, Ni, Cr, Si, Al, As, O, Se, Te, Mg, Na, Ca, Sb, B, Ga or a mixture thereof in their respective oxidation and/or the anionic doping agent comprises $O^{2-}$ $S^{2-}$, $Se^{2-}$, or $Te^{2-}$.
41. A solid electrolyte obtainable by a method according to any of items 30-40.
42. A solid electrolyte represented by the following formula (II):

$$Li_{(2c+d-n)}Y^{n+}S_cX_d \quad (II)$$

wherein X is independently selected from group 17 elements,
Y is independently selected from P, As, Ge, Si, B, Sn, Ga, Al and Sb,
$4 \leq n \leq 5$,
$4 \leq c \leq 6$, and
$0 < d \leq 2$,
being substantially free from reflections in a X-ray powder diffractogram using $CuK_\alpha$ radiation at a 2θ angle [°]:17.5, 18.0, 32.5, 34.9, 44.8, 46.7, 50.2 and/or 53.1.
43. The solid electrolyte according to item 42, being substantially free from reflections in a X-ray powder diffractogram using $CuK_\alpha$ radiation at a 2θ angle [°]:17.5, 18.0, 32.5, 34.9, 44.8, 46.7, 50.2 and 53.1.

44. The solid electrolyte according to any of items 42-43, having characteristic reflections in a X-ray powder diffractogram using CuK$_\alpha$ radiation at a 2θ angle [°]:25.2, 25.5, 29.6, 30.0, 31.0 and/or 31.4.
45. The solid electrolyte according to any of items 42-44, further comprising at least one dopant.
46. The solid electrolyte according to item 45, wherein the dopant is selected from Mn, Ge, Sn, V, Ni, Cr, Si, Al, As, Se, O, Te, Mg, Na, Ca, Sb, B, Ga or a mixture thereof in their respective oxidation state.
47. The solid electrolyte according to any of items 45-46, wherein the dopant is present in an amount of less than 10 wt. %, preferably 0.01-9.0 wt. %, more preferably 0.10-5.0 wt. %, with reference to the total weight of the solid electrolyte.
48. The solid electrolyte according to any of items 42-47, having an ionic conductivity of 0.01-500 mS/cm, preferably 1-100 mS/cm at 20° C.
49. The solid electrolyte according to any of items 42-48, wherein X is independently selected from Cl, Br and I.
50. The solid electrolyte according to any of items 42-49, wherein 0.8≤d≤1.2.
51. The solid electrolyte according to any of items 42-50, wherein 4.5≤c≤5.5.
52. The solid electrolyte according to any of items 42-41, wherein $Y^{n+}$ is independently selected from $P^{5+}$, $As^{5+}$, $Ge^{4+}$, $Si^{4+}$, $B^{3+}$, $Sn^{4+}$, $Ga^{3+}$, $Al^{3+}$ and $Sb^{5+}$.
53. The solid electrolyte according to any of items 42-52, wherein $Y^{n+}$ is $P^{5+}$.
54. The solid electrolyte according to any of items 42-53, being selected from $Li_6PS_5Cl$, $Li_6PS_5Br$ and $Li_6PS_5I$.
55. An electrochemical cell comprising the solid electrolyte according to any of items 42-53.
56. Use of a solid electrolyte according to any of items 42-53 in an electrochemical cell or capacitor, a fuel cell, a battery, or a sensor.

The invention claimed is:
1. A solid electrolyte precursor represented by the following formula (I):

wherein:
X is independently selected from group 17 elements,
2≤a≤3,
0<b≤2, and
the precursor is in a crystalline state.
2. The precursor according to claim 1, being selected from $Li_6S_{2.5}Cl$, $Li_6S_{2.5}Br$ and $Li_6S_{2.5}I$.
3. The precursor according to claim 1, further comprising at least one dopant selected from the group consisting of Mn, Ge, Sn, V, Ni, Cr, Si, Al, As, Se, O, Te, Mg, Na, Ca, Sb, B, Ga and a mixture thereof.
4. A method for producing a solid electrolyte precursor according to claim 1, comprising the steps of:
(i) providing a lithium salt in a reaction vessel,
(ii) contacting at least one first reaction gas and at least one second reaction gas with the lithium salt of step (i) at elevated temperatures such as above 80° C., preferably at 90-250° C., and
(iii) optionally discharging the product obtained in step (ii),
wherein one of the first and the second reaction gas is a sulfur-containing gas and the other reaction gas is a X-containing gas.
5. The method according to claim 4, wherein the lithium salt in step (i) is LiOH, $Li_2CO_3$, $Li_2SO_4$, $Li_2O$, $Li_2O_2$ or a mixture thereof.
6. The method according to claim 4, wherein the at least one first reaction gas is a hydrogen halide, or
wherein the at least one first reaction gas is a sulfur source selected from the group consisting of $H_2S$, $S_8$, $CS_2$, mercaptanes or a mixture thereof.
7. The method according to claim 4, wherein the molar ratio of S in S-containing reaction gas to X in X-containing reaction gas is 10:1-1:1.
8. Use of a solid electrolyte precursor according to claim 1, for preparing a solid electrolyte.
9. A method for preparing a solid electrolyte, comprising the steps of:
(a) providing a solid electrolyte precursor according to claim 1, in a reaction vessel,
(b) contacting a Y-containing component with the solid electrolyte precursor of step (a), and
(c) optionally discharging the product obtained in step (b), wherein step (b) is performed at elevated temperatures,
wherein Y is independently selected from P, As, Ge, Si, B, Sn, Ga, Al and Sb, and wherein the Y-containing component is at least partially present in a gaseous phase in step (b).
10. The method according to claim 9, wherein the Y-containing component is selected from the group consisting of $P_2S_5$, $As_2S_5$, $GeS_2$, $SiS_2$, $B_2S_3$, SnS, $Ga_2S_3$, $Al_2S_3$, $Sb_2S_5$ and a mixture thereof.
11. The method according to claim 9, wherein in step (b) the molar ratio of Y in Y-containing component to solid electrolyte precursor provided in step (a) is 0.2:1-2:1.
12. The precursor according to claim 1, wherein X is independently selected from the group consisting of Cl, Br, and I.
13. The precursor according to claim 1, wherein 2.4≤a≤2.6.
14. The precursor according to claim 1, wherein 0.8≤b≤1.2.
15. The method according to claim 6, wherein:
the at least one second reaction gas is a sulfur source selected from the group consisting of $H_2S$, $S_8$, $CS_2$, mercaptanes or a mixture thereof, or
the at least one second reaction gas is a hydrogen halide, such as HCl, HBr, HI or a mixture thereof.
16. The method according to claim 7, wherein the molar ratio of S in S-containing reaction gas to X in X-containing reaction gas is 3:1-1.5:1.

* * * * *